(12) United States Patent
Young

(10) Patent No.: US 11,604,723 B2
(45) Date of Patent: *Mar. 14, 2023

(54) A/B TESTING FOR MOBILE APPLICATIONS

(71) Applicant: eBay Inc., San Jose, CA (US)

(72) Inventor: Dawnray Young, Camas, WA (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/210,944

(22) Filed: Mar. 24, 2021

(65) Prior Publication Data

US 2021/0209014 A1 Jul. 8, 2021

Related U.S. Application Data

(63) Continuation of application No. 16/695,084, filed on Nov. 25, 2019, now Pat. No. 10,983,905, which is a continuation of application No. 15/722,127, filed on Oct. 2, 2017, now Pat. No. 10,521,334, which is a continuation of application No. 14/304,196, filed on Jun. 13, 2014, now Pat. No. 9,792,205.

(51) Int. Cl.
| | |
|---|---|
| *G06F 11/36* | (2006.01) |
| *H04W 4/18* | (2009.01) |
| *G06F 9/451* | (2018.01) |

(52) U.S. Cl.
CPC .......... *G06F 11/3688* (2013.01); *G06F 9/451* (2018.02); *H04W 4/18* (2013.01)

(58) Field of Classification Search
CPC ............. G06F 11/3409; G06F 11/3476; G06F 11/3495; G06F 11/3664
See application file for complete search history.

(56) References Cited

U.S. PATENT DOCUMENTS

| | | | |
|---|---|---|---|
| 6,477,575 B1 | 11/2002 | Koeppel et al. | |
| 7,975,000 B2 | 7/2011 | Dixon et al. | |
| 8,090,703 B1 | 1/2012 | Agarwal et al. | |
| 8,819,122 B2 | 8/2014 | Ravichandran et al. | |
| 9,208,063 B1 | 12/2015 | Sisinni et al. | |
| 9,792,205 B2 | 10/2017 | Young | |
| 10,152,458 B1* | 12/2018 | Stepaniants | G06Q 30/0202 |
| 10,521,334 B2 | 12/2019 | Young | |
| 10,983,905 B2 | 4/2021 | Young | |
| 2002/0062245 A1 | 5/2002 | Niu et al. | |
| 2005/0021935 A1* | 1/2005 | Schillings | H04M 1/72448 |
| | | | 713/1 |

(Continued)

OTHER PUBLICATIONS

Final Office Action received for U.S. Appl. No. 14/304,196, dated Dec. 1, 2015, 70 pages.

(Continued)

*Primary Examiner* — Duy Khuong T Nguyen
(74) *Attorney, Agent, or Firm* — Schwegman Lundberg & Woessner, P.A.

(57) ABSTRACT

A machine may be configured to perform A/B testing on mobile applications. For example, the machine receives an identifier of a user from a mobile device that requests a layout description of a user interface, determines the layout description that provides a configuration of one or more elements of the user interface according to an experiment variant associated with an experiment, and causes display of the one or more elements of the user interface on the mobile device based on the layout description.

15 Claims, 10 Drawing Sheets

(56) References Cited

U.S. PATENT DOCUMENTS

| | | | |
|---|---|---|---|
| 2006/0162071 A1* | 7/2006 | Dixon | G06Q 30/0243 |
| | | | 5/93.1 |
| 2007/0089091 A1 | 4/2007 | Larab et al. | |
| 2007/0167182 A1 | 7/2007 | Fenhunen et al. | |
| 2009/0254912 A1 | 10/2009 | Roundtree et al. | |
| 2011/0231821 A1 | 9/2011 | Sahni et al. | |
| 2011/0320424 A1 | 12/2011 | Zias et al. | |
| 2013/0061151 A1 | 3/2013 | Perry | |
| 2013/0104113 A1 | 4/2013 | Gupta et al. | |
| 2013/0124634 A1* | 5/2013 | Weinstein | G06Q 30/02 |
| | | | 709/204 |
| 2013/0138503 A1 | 5/2013 | Brown et al. | |
| 2013/0346234 A1 | 12/2013 | Hendrick et al. | |
| 2014/0075336 A1 | 3/2014 | Curtis et al. | |
| 2014/0109066 A1 | 4/2014 | Dhanda | |
| 2015/0026522 A1 | 1/2015 | Young et al. | |
| 2015/0160931 A1 | 6/2015 | Glazer et al. | |
| 2015/0363302 A1 | 12/2015 | Young | |
| 2017/0278128 A1* | 9/2017 | Xu | G06Q 30/0243 |
| 2018/0024917 A1 | 1/2018 | Young | |
| 2020/0125486 A1 | 4/2020 | Young | |

OTHER PUBLICATIONS

Final Office Action received for U.S. Appl. No. 14/304,196, dated Nov. 4, 2016, 87 pages.

Non-Final Office Action received for U.S. Appl. No. 14/304,196, dated Jun. 3, 2016, 80 pages.

Non-Final Office Action received for U.S. Appl. No. 14/304,196, dated Aug. 18, 2015, 64 pages.

Notice of Allowance received for U.S. Appl. No. 14/304,196, dated Jun. 16, 2017, 6 pages.

Final Office Action received for U.S. Appl. No. 15/722,127, dated Jun. 3, 2019, 28 pages.

Non-Final Office Action received for U.S. Appl. No. 15/722,127, dated Feb. 13, 2019, 30 pages.

Notice Of Allowance received for U.S. Appl. No. 15/722,127, dated Aug. 21, 2019, 15 pages.

Non Final Office Action Received for U.S. Appl. No. 16/695,084, dated Sep. 1, 2020, 33 Pages.

Notice Of Allowance received for U.S. Appl. No. 16/695,084, dated Dec. 18, 2020, 9 Pages.

Unbounce, "The Ultimate Guide to A/B Testing," Retrieved from the Internet URL: http://www.datascienceassn.org/sites/default/files/A-B%20Testing%20Guide.pdf, Oct. 2, 2012, pp. 1-87.

* cited by examiner

A/B TESTING FOR MOBILE APPLICATIONS

CROSS REFERENCE TO RELATED APPLICATIONS

This application is a continuation of and claims priority to U.S. patent application Ser. No. 16/695,084, filed Nov. 25, 2019, which is a continuation of and claims priority to U.S. patent application Ser. No. 15/722,127, filed Oct. 2, 2017, which is a continuation of and claims priority to U.S. patent application Ser. No. 14/304,196, filed Jun. 13, 2014, each of which is hereby incorporated by reference herein in its entirety.

TECHNICAL FIELD

The present application relates generally to the processing of data, and, in various example embodiments, to systems and methods for performing A/B testing using mobile applications.

BACKGROUND

The proliferation of online stores has led to users expecting high-quality and user-friendly presentations of products and service available for sale online. In their attempt to maximize profits and meet customer expectations, many online merchants may test different characteristics of the web pages of their online stores by performing A/B tests using the respective web pages.

A/B testing may be used to identify changes to web pages that increase a particular desired outcome. An A/B test is an experiment that has two versions, A and B, which are identical except for one variation that may influence a user's choice of action. During an A/B test, different statistically significant groups of users may be presented with different variations of an experiment to measure the users' responses to the respective experiment variations. Experiment variations may include differences in elements of a user interface presented to different users, wording differences in the messages addressed to the different respective users (e.g., "offer ends soon" or "offer ends Sunday"), etc.

The responses of the users to the respective experiment variations may be measured and used to generate test results (also referred to as "experiment results") for each of the variations of the experiment. Examples of measurable outcomes of A/B tests are a click-through rate, the number of users registering to receive message from the online merchant, the number of sales made, etc. The test results of the particular experiment variations may be compared to determine which experiment variation is better at accomplishing a particular goal of the experiment.

BRIEF DESCRIPTION OF THE DRAWINGS

Some embodiments are illustrated by way of example and not limitation in the figures of the accompanying drawings.

DETAILED DESCRIPTION

Figure 1:
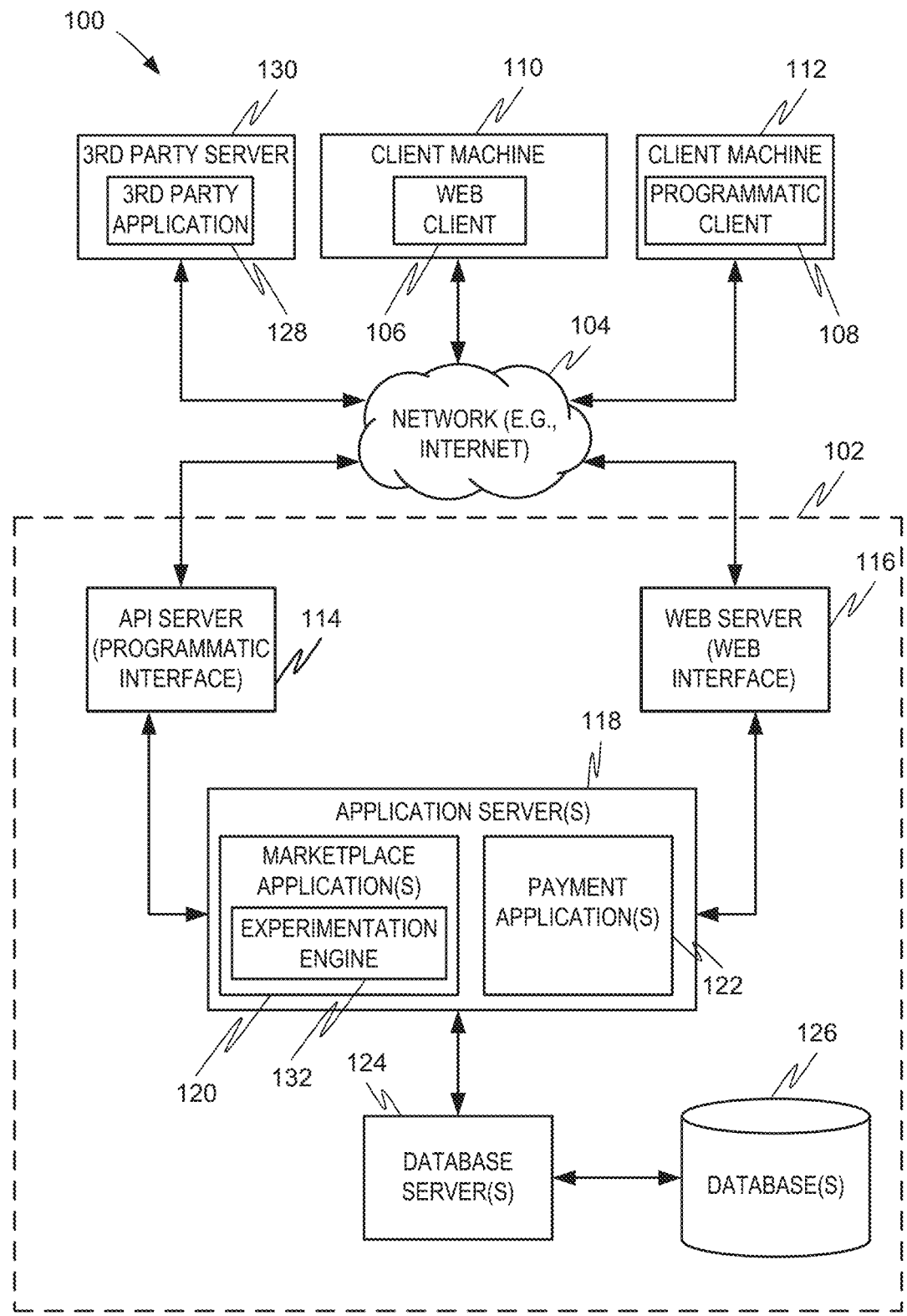
FIG. 1 is a network diagram depicting a client-server system, within which some example embodiments may be deployed.

Example methods and systems for facilitating the performance of A/B tests on mobile applications are described. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An A/B test performed online, generally, may facilitate the selection and presentation of two variations of an experiment to two sets of users, as well as the collection and analysis of the users' responses to the two variations of the experiment. The two variations of the experiment usually differ in one particular way. The difference between the two variations may be, for example, in the display of the information or in the content of the information. The A/B test (hereinafter, also "A/B experiment", "experimentation", or "experiment") may be performed based on the information presented to users via a web site or a mobile application.

In some example embodiments, an experiment is designed to test (e.g., measure) user responses to a particular variation in how an element of a user interface (also "UI") is presented. A UI element may be characterized by a number of parameters (hereinafter, also "attributes") such as color, size, shape, content, pattern, background, etc., and by a number of parameter values (hereinafter, also "attribute values") that correspond to each of the parameters. According to one example, the parameter "color" may take a value such as "yellow", "blue", "green", etc. According to another example, the parameter "background" may take a value such as "clear", "white", "black", etc.

A particular experiment may include a plurality of versions (or variations). For example, a first variation of the experiment specifies that the UI element A (e.g., an image) to be displayed to a first group of users is characterized by the parameter "shape" and the parameter value "rectangle." A second variation of the experiment specifies that the UI element A to be displayed to a second group of users is characterized by the parameter "shape" and the parameter value "circular."

In another example, the difference between the variations of the experiment is the parameter value that corresponds to the parameter "size" of the UI element "image" displayable in the UI. Each user in a first group of mobile application users is to be shown a smaller-sized image displayed on the users' mobile devices via a particular mobile application.

Each user in a second group of users is to be shown a larger-sized image displayed on the users' mobile devices via the particular mobile application. The experiment may, for example, count the number of users in each group who selected the image to obtain additional information regarding the particular image or the items illustrated in the particular image.

In yet another example, a first variation of the experiment specifies that a first user group is shown a UI that includes the UI element "button" characterized by the parameter "color" and the parameter value "green." The second variation of the experiment specifies that a second user group is shown a UI that includes the UI element "button" characterized by the parameter "color" and the parameter value "red."

Generally, the A/B experiments performed on web sites are easily performed and cause little, if any, disruption or inconvenience to the users. A user's browser application, as the client of a web server, simply displays the information provided by the web server. The content of the information or the display of the information may be customized for presentation to different users according to a particular experiment variation without requiring any additional work by the users.

In contrast, the A/B experiments performed on mobile applications (e.g., native mobile applications) stored on mobile devices may present certain challenges. Examples of such challenges are the need to include logic for performing a particular test variation into the code of the mobile application stored on the mobile devices of numerous users, the long "tail" (e.g., period) of the mobile application version upgrade cycle, the expenditure of resources to maintain different versions of the mobile application, etc.

Unfortunately, because some users of the mobile application delay upgrading the mobile application to a newer version for a long period of time (also called a "tail"), certain A/B tests may not be performed until a critical number of users have upgraded their mobile application. The long "tail" of the mobile application version upgrade cycle may cause an increased expenditure of resources for maintaining different versions of the mobile application and a delay in performing A/B tests using the mobile application.

In some example embodiments, the conventional performing of an A/B test on native mobile applications may include receiving, as a result of a mobile application being invoked, an identifier (e.g., a user login or a mobile device identifier) at an A/B testing service on a server from the mobile device. The server-side code (e.g., the A/B testing service) may determine which treatment (e.g., variance, variation, etc.) of an experiment may be run by the mobile application, based on one or more algorithms for determining (e.g., selecting) a particular treatment based on the identifier. This process is called qualification. The selected treatment when run by the mobile application may allow the user of the mobile application to have a particular experience (e.g., view a particular layout of the UI) particularly selected for the user by the server-side code.

Upon the completion of the qualification by the server-side code, a data structure may then be transmitted from the A/B testing service to the mobile application. The data structure may reference (e.g., identify, include, etc.) a particular experimentation and the particular treatment. In response to receiving the data structure, the mobile application may deliver a particular experience to the user according to the particular experimentation and the particular treatment. For example, an experiment may include three treatments: a large icon, a midsized icon, and a small icon. Upon receiving the data structure that references one of the three treatments from the A/B testing service, the mobile application may display a particular icon size to the user based on the particular treatment referenced in the data structure.

In the context of a conventionally performed experimentation, each new experimentation (e.g., A/B testing) may require that the mobile application include logic (e.g., code) for all possible treatments pertinent to the new experimentation in order for the mobile application to present any of the possible experiences to the user based on the respective selected treatment of the experimentation. A native mobile application may include a number of pre-wired (e.g., pre-coded) experiences associated with particular treatments of a particular experiment.

For example, to display images of different sizes, the mobile application must include logic for receiving the experiment data (e.g., parameters or parameter values) and for determining, based on the experiment data, which size image the mobile application may display. If a particular variation in what may be displayed to the user is not anticipated by the engineers who designed the mobile application, and the logic for the particular variation is not coded in the mobile application, then the particular variation may not be tested on the mobile application. The code of the mobile application may require changing in order to support the testing of the particular variation. In some instances, changing the code for a new variation of an experiment may require releasing an updated version of the mobile application.

A large company may perform hundreds of A/B tests each year. This may require new versions of the mobile applications to be installed by the company's user base frequently. But unlike web applications, which are deployed on demand, native mobile applications are compiled code that may be distributed and installed on mobile devices individually. Because there may a percentage of mobile users who choose not to update (or defer update) the mobile application to the latest version for a variety of reasons, some users may not experience the newer AB tests if they do not update the mobile application.

In some example embodiments, an experimentation system communicatively coupled to mobile devices facilitates the performance of A/B testing on the mobile devices such that the experimentation system, rather than the copies of the mobile application stored on the mobile device, determines which test variation is to be run on a particular copy of the mobile application. In some example embodiments, the domain of A/B tests may be described in a specific instruction set interpretable dynamically by mobile applications stored on mobile devices such that the mobile applications may not require re-compilation when new A/B tests are performed. Different experiences of using the mobile application may be anticipated (e.g., abstracted), for example, by software developers or automatically by the experimentation system, and the functionality for the anticipated experiences may be coded into the mobile application. The abstracting of different experiences may include identifying the parameters of a UI element, or combination (e.g., permutation) of parameters, and possible parameter values corresponding to the respective parameters that characterize different functionalities of the mobile application.

For example, the UI presented by the mobile application to the user may display an image that has the following parameters (e.g., attributes or characteristics): a size, a shape, a content, and a state (e.g., animated or static). Possible variations of the values taken by these attributes may be anticipated, and may be coded in the mobile application. For instance, to facilitate the display of an image in a rectangular UI element when displayed to a first user and in a circular UI element when displayed to a second user, the particular difference (or variation) in how the image is displayed is anticipated, and the logic for both possibilities is coded into the mobile application.

According to another example, an experimentation may include several experimentation treatments that differ based on one or more elements in a UI layout. The experimentation system may generate a particular description of the characteristics of the elements (e.g., components) of a layout for each treatment of the experimentation. Examples of element characteristics of UI elements are size, color, shape, or position. A particular copy of a mobile application may transmit a request for a layout instruction (e.g., an instruction that references a layout description) from the experimentation system (e.g., an A/B test service running on a server) each time the mobile application is about to render a display. The request for a layout instruction may include an identifier (e.g., a user ID, such as a user login, or a mobile device ID, or a mobile application copy ID) to identify the origin of the request. The experimentation system, in response to the request for a layout instruction received from the particular copy of the mobile application, may identify a particular treatment for the particular copy of the mobile application based on the identifier received with the request and based on one or more algorithms for selecting a treatment. The experimentation system may then identify the particular layout description that corresponds to the particular treatment and may transmit a layout instruction that references the particular layout description to the particular copy of the mobile application via the mobile device that stores the particular copy of the particular mobile application. In some instances, the mobile application includes a generic mechanism to execute the layout instruction and render dynamically, at run-time, a display described by the layout instruction.

In some example embodiments, in response to the request for a layout instruction received from the particular copy of the mobile application, the experimentation system may select a particular treatment and may dynamically generate a layout description according to the selected treatment and generate a response to the request for the layout instruction. The response (e.g., an instruction) may reference (e.g., include) the layout description. The layout description may be interpreted generically by the mobile application without the need to roll out a new version of the mobile application. This approach may allow the experimentation system to conduct a high volume of experimentations without affecting the mobile applications stored on different mobile devices (e.g., without requiring the mobile applications to "understand" or identify the experimentation protocol and experimentation exchange with the experimentation system, or to "know" or determine that the mobile applications may be performing particular variants of an experimentation).

In some example embodiments, the parameterizing of a given set of experiences or the describing of the given set of experiences based on one or more instructions (e.g., providing a description of an experience or treatment in an instruction) may obviate the need for a mobile application to determine details (e.g., conditions, content, context, etc.) of an experimentation. The mobile application may deliver various experiences based on the treatment dynamically selected by the experimentation system at the backend for one or more particular copies of the mobile application. The experimentation system may change the treatments selected for different copies of the mobile application at any time without requiring re-coding, re-distribution, or re-installation of the mobile application copies. This may allow an organization utilizing the experimentation system to have increased flexibility in modifying existing experimentations or devising new experimentations, as well as to reduce the costs of running a large number of experimentations.

Based on the abstraction of different experiences of using the mobile application, the experimentation system may control the logic (e.g., the software, the code, etc.) used to deliver the different experiences. In some example embodiments, the logic can be stored on a server of the experimentation system instead of in the mobile application on the mobile device associated with a user. The server may control (e.g., via a command or instruction) what experience (e.g., configuration of the UI) a particular copy of the mobile application displays to a user. By allowing the experimentation system to control one or more aspects of the configuration of the UI displayed by the mobile application on the mobile device, the performance of A/B tests using mobile applications is not hindered by the long "tail" of the mobile application version upgrade cycle.

In some example embodiments, the experimentation system receives an identifier of a first mobile device that stores a first copy of a mobile application. The experimentation system identifies, based on the identifier of the first mobile device, a parameter of an element of a user interface displayed by the first copy of the mobile application on the first mobile device. The experimentation system selects, for example, based on the identifier of the first mobile device, a first parameter value that corresponds to the parameter. In certain example embodiments, instead of identifying the parameter and/or parameter value based on the identifier of the first mobile device, the experimentation system identifies the parameter and/or parameter value based on a user identifier (ID) such as a user name or login ID, a version of the mobile application, a context of the mobile application (e.g., the "view image" context), etc.

The experimentation system then generates, using at least one processor, a first instruction referencing the first parameter value. In some instances, the first instruction also references the parameter. The first instruction may be executable by the first copy of the mobile application to display the element of the user interface on the first mobile device according to the first parameter value. In response to receiving the identifier of the first mobile device, the experimentation system transmits the first instruction to the first mobile device.

In addition, the experimentation system receives an identifier of a second mobile device that stores a second copy of the mobile application. The experimentation system identifies, based on the identifier of the second mobile device, a second parameter value that corresponds to the parameter. The experimentation system generates a second instruction referencing the second parameter value. In some instances, the second instruction also references the parameter. The second instruction may be executable by the second copy of the mobile application to display the element of the user interface on the first mobile device according to the second parameter value. In response to receiving the identifier of the second mobile device, the experimentation system transmits the second instruction to the second mobile device.

The first copy of the mobile application and the second copy of the mobile application execute the first instruction and the second instruction, respectively, at run time. The execution of the first and second instructions causes the display of the element of the user interface on the first mobile device according to the first parameter value and the display of the element of the user interface on the second mobile device according to the second parameter value. Data that pertains to the interactions by the users of the first copy of the mobile application or of the second copy of the mobile application with the particular UIs displayed on the users' mobile devices may be captured and analyzed by the experimentation system or, in some instances, by the respective copies of the mobile application. The experimentation system may generate, based on the captured data, metrics that measure and/or compare user responses to the experiment variations.

FIG. 1 is a network diagram depicting a client-server system 100, within which some example embodiments may be deployed. A networked system 102, in the example forms of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer browser developed by Microsoft Corporation of Redmond, Wash. State) and a programmatic client 108 executing on respective devices 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. In various example embodiments, the marketplace applications 120 may include an experimentation engine 132. The experimentation engine 132, in some example embodiments, determines a particular experiment variation for a user's mobile application and facilitates the performance of the particular experiment variation using the user's mobile application.

The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
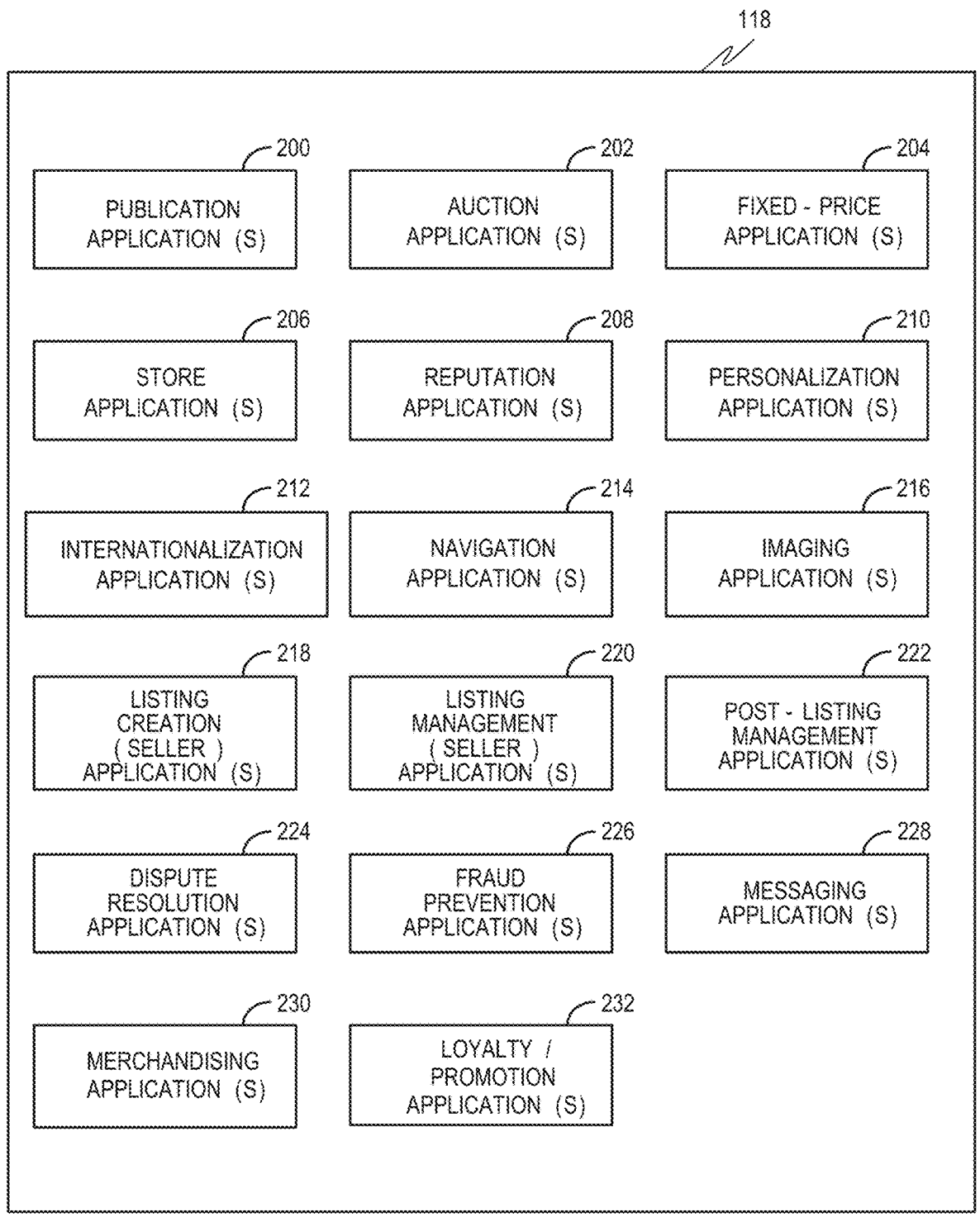
FIG. 2 is a block diagram illustrating marketplace and payment applications and that, in some example embodiments, are provided as part of application server(s) 118 in the networked system.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or to provide promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
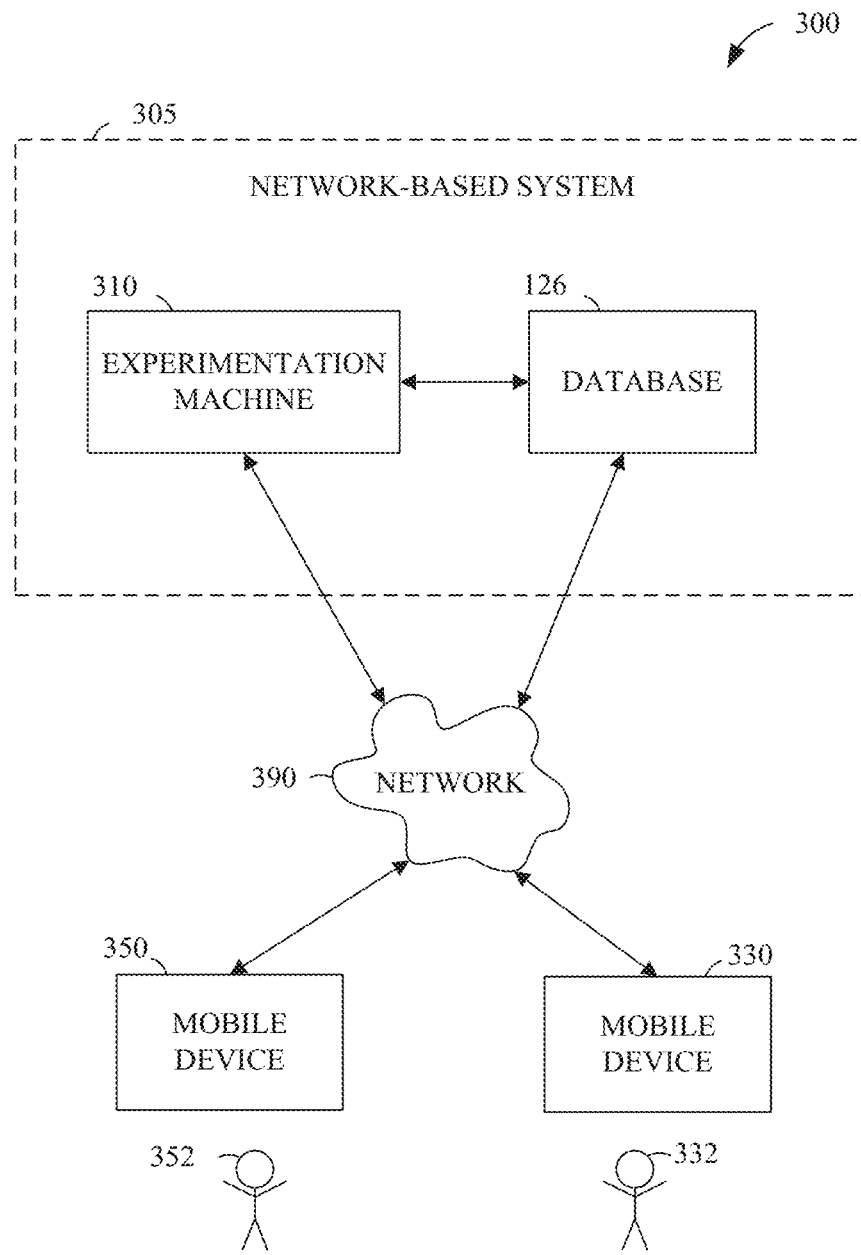
FIG. 3 is a network diagram illustrating a network environment suitable for A/B testing using mobile applications, according to some example embodiments.

FIG. 3 is a network diagram illustrating a network environment 300 suitable for facilitating the performance of A/B tests and multivariate tests using mobile applications, according to some example embodiments. The network environment 300 includes an experimentation machine 310 (e.g., the experimentation engine 132), a database 126, and mobile devices 330 and 350, all communicatively coupled to each other via a network 390. The experimentation machine 310, with or without the database 126, may form all or part of a network-based system 305. The experimentation machine 310 and the mobile devices 330 and 350 may each be implemented in a computer system, in whole or in part, as described below with respect to FIGS. 9 and 10.

Also shown in FIG. 3 are users 332 and 352. One or both of the users 332 and 352 may be a human user (e.g., a human being), a machine user (e.g., a computer configured by a software program to interact with the mobile device 330), or any suitable combination thereof (e.g., a human assisted by a machine or a machine supervised by a human). The user 332 is not part of the network environment 300, but is associated with the mobile device 330 and may be a user of the mobile device 330. For example, the mobile device 330 may be a vehicle computer, a tablet computer, a navigational device, a portable media device, a smartphone, or a wearable device (e.g., a smart watch or smart glasses) belonging to the user 332. Likewise, the user 352 is not part of the network environment 300, but is associated with the mobile device 350. As an example, the mobile device 350 may be a vehicle computer, a tablet computer, a navigational device, a portable media device, a smartphone, or a wearable device (e.g., a smart watch or smart glasses) belonging to the user 352.

In some example embodiments, the mobile devices 330 and 350 store copies of a mobile application. According to certain example embodiments, the experimentation machine 310 may facilitate the performance of different experiment variations using the respective copies of the mobile applications stored on the mobile device 330 and the mobile device 350. The facilitating of the performance of different experiment variations may be based on communications transmitted to the mobile devices 330 and 350 via the network 390. For instance, the experimentation machine 310 may cause a first copy of the mobile application stored on the mobile device 350 to display a first user interface configuration for use by the user 352, and may cause a second copy of the mobile application stored on the mobile device 330 to display a second user interface configuration for use by the user 332. The first and second user interface configurations may differ from each other in one or more ways. The interactions by the user 352 and the user 332 with the particular user interface displayed by the respective copies of the mobile application stored on the mobile device 350 and the mobile device 330, respectively, may be tracked (e.g., by the mobile devices 350 and 330) and communicated to the experimentation machine 310 via the network 390 for analysis.

Any of the machines, databases, or devices shown in FIG. 3 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 3 may be combined into a single machine, and the functions described herein for any single machine, database, or device may be subdivided among multiple machines, databases, or devices.

The network 390 may be any network that enables communication between or among machines, databases, and devices (e.g., the server machine 310 and the mobile device 330). Accordingly, the network 390 may be a wired network, a wireless network (e.g., a mobile or cellular network), or any suitable combination thereof. The network 390 may include one or more portions that constitute a private network, a public network (e.g., the Internet), or any suitable combination thereof. Accordingly, the network 390 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 390 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 4:
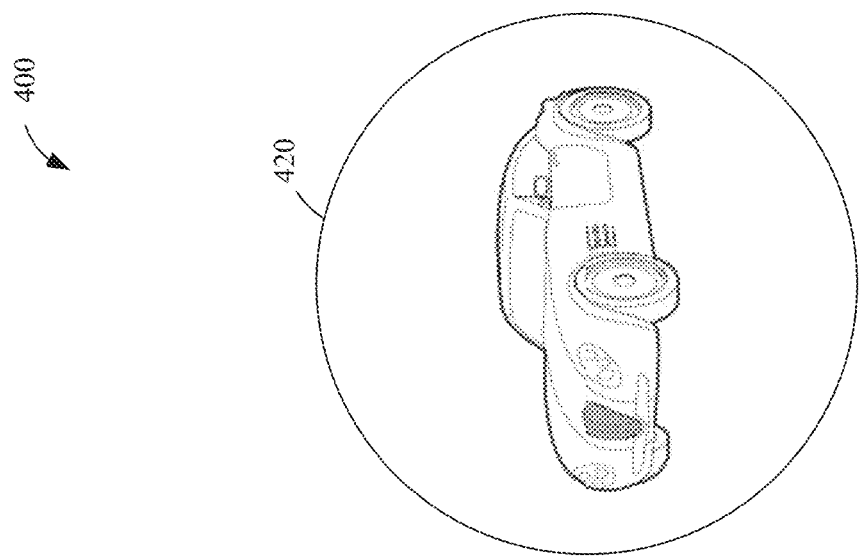
FIG. 4 is a diagram illustrating example user interface elements, according to some example embodiments.
Figure 4:
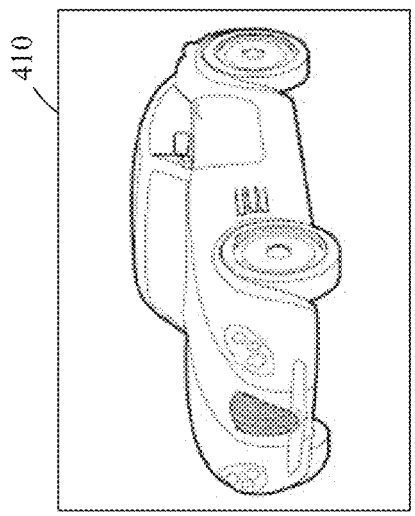

FIG. 4 is a diagram illustrating example user interface elements, according to some example embodiments. A user interface (UI) displayed to a user of a mobile application by the mobile application may include a number of UI elements, such as titles, headlines, buttons, images, colors, form fields, backgrounds, windows, etc. Each of the UI elements may have one or more parameters (or attributes) that characterize the respective UI element. Each attribute of a UI element may have many possible values. According to some example embodiments, an image may be characterized by different attributes (e.g., size, shape, content, color, etc.) The image attributes may take different values. Examples of attribute values that correspond to the "shape" attribute may be "rectangular", "circular", "triangle", "pointillistic", or "collage."

According to certain example embodiments, the experimentation machine 310 identifies a first variation of an experiment based on the identifier of the user 332 and a second variation of the experiment based on the identifier of the user 352. The first variation of the experiment may specify that an image of a car is to be displayed by the mobile application copy stored on the mobile device 330 as a rectangular shape 410, as shown in FIG. 4. The second variation of the experiment may specify that the image of the car is to be displayed by the mobile application copy stored on the mobile device 350 as a circular shape 420, as shown in FIG. 4.

The experimentation machine 310 may cause a particular copy of the mobile application to generate a particular UI to be displayed to the user of the particular copy of the mobile application. By issuing and transmitting, to the mobile device that stores the particular mobile application copy, a command that references (or specifies) a particular attribute value or attribute-value pair that characterizes an element of the UI, the experimentation machine 310 controls the customization of the UI for the user of the particular mobile application copy. The particular mobile application copy stored on the mobile device, at run time, may execute the command received from the experimentation machine 310 and may display the image under the conditions specified by the experimentation machine 310 in the instruction.

For example, upon identifying the first variation of the experiment, the experimentation machine 310 generates and transmits a first instruction to the mobile device 330. In some example embodiments, the first instruction may reference (e.g., include) the "shape" attribute of the "image" UI element and the attribute value "rectangular." The first mobile application copy stored on the mobile device 330, at run time, executes the command received from the experimentation machine 310 and displays (or renders) the image as a rectangular shape (e.g., in a rectangular frame) 410.

Similarly, upon identifying the second variation of the experiment, the experimentation machine 310 generates and transmits a second instruction to the mobile device 350. In some example embodiments, the second instruction may reference (e.g., include) the "shape" attribute of the "image" UI element and the attribute value "circular." The second mobile application copy stored on the mobile device 350, at run time, executes the command received from the experimentation machine 310 and displays (or renders) the image as a circular shape (e.g., in a circular frame) 420.

Figure 5:
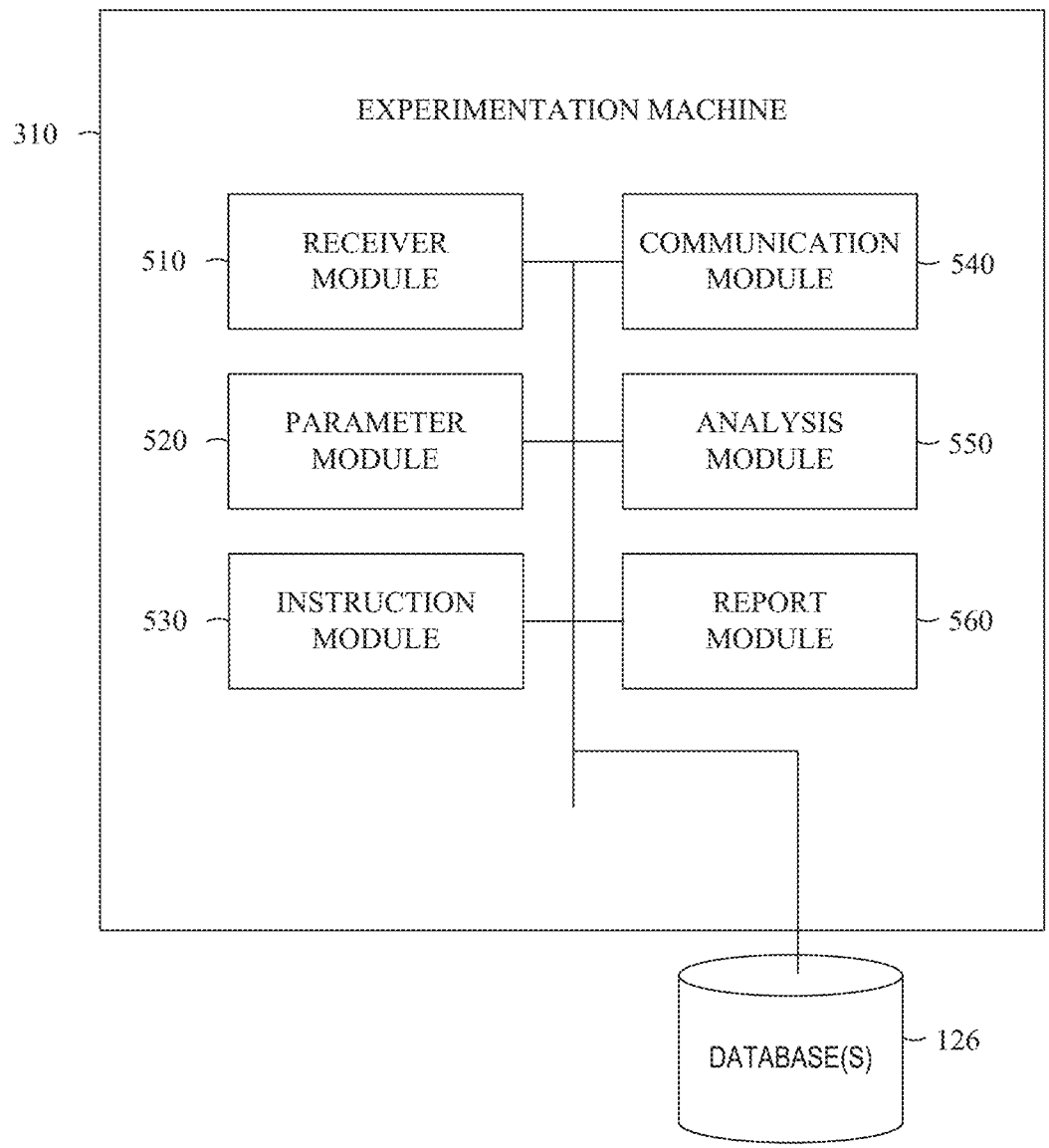
FIG. 5 is a block diagram illustrating components of the experimentation machine, according to some example embodiments.

FIG. 5 is a block diagram illustrating components of the experimentation machine 310, according to some example embodiments. The experimentation machine 310 is shown as including a receiver module 510, a parameter module 520, an instruction module 530, a communication module 540, an analysis module 550, and a report module 560, all configured to communicate with each other (e.g., via a bus, shared memory, or a switch).

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, so as to allow information to be passed between the applications so as to allow the applications to share and access common data. Furthermore, the modules may access one or more databases 126 via the database servers 124.

The receiver module 510 is configured to receive, in certain example embodiments, an identifier of a mobile device that stores a mobile application. In various example embodiments, the receiver module 510 is configured to receive an identifier of the user (e.g., a user ID) of the mobile application, a version of the mobile application, an indication of the context of the mobile application (e.g., the "view image" context), etc.

The parameter module 520 is configured to identify a parameter of an element of a user interface displayed by the mobile application on the mobile device. The identifying of the parameter of the element of the user interface is based, in some instances, on the identifier of the mobile device. In other instances, identifying of the parameter is based on the identifier of the user of the mobile application, the version of the mobile application, or the context of the mobile application. The parameter may be identified (e.g., selected) by the parameter module 520 from a plurality of parameters. The parameter module 520 is also configured to select a parameter value that corresponds to the parameter. The parameter value may be selected by the parameter module 520 from a plurality of parameter values that correspond to the parameter. In some instances, the selecting of the parameter value is based on the identifier of the mobile device. In other instances, the selecting of the parameter value is based on the identifier of the user of the mobile application, the version of the mobile application, or the context of the mobile application.

According to some example embodiments, the parameter module 520 is further configured to identify an experiment for the mobile application. In some instances, the identifying of the experiment is based on the identifier of the mobile device. In other instances, the identifying of the experiment is based on the identifier of the user of the mobile application, the version of the mobile application, or the context of the mobile application.

In some example embodiments, the experiment specifies (e.g., identifies) the parameter identified by the parameter module 520. The parameter module 520 may identify the experiment before identifying the parameter of the element of the user interface. In certain example embodiments, the experiment specifies a parameter-value pair that characterizes the element of the user interface. The parameter-value may include the parameter and a parameter value that corresponds to the parameter.

In various example embodiments, the parameter module 520 determines a version of the mobile application stored on the mobile device. The determining of the version of the mobile application may be based on the identifier of the mobile device. The identifying of the parameter may be based on the version of the mobile application.

The instruction module 530 is configured to generate an instruction referencing the parameter value. The instruction is executable by the mobile application to display the element of the user interface on the mobile device according to the parameter value. In some example embodiments, the execution of the instruction by the mobile application causes a display of the element of the user interface by the mobile application on the mobile device according to the parameter value.

The communication module 540 is configured to transmit the instruction to the mobile device. The transmitting may be performed in response to receiving the identifier of the mobile device (or the identifier of the user of the mobile device).

The analysis module 550 is configured to access data that describes (e.g., a descriptor of) an interaction by the user with the copy of the mobile application stored on the mobile device with which the user is associated. The interaction with the copy of the mobile device may be an interaction by the user with a user interface displayed to the user on the user's mobile device by the copy of the mobile application upon executing the instruction received from the communication module 540 of the experimentation machine 310. The analysis module 550 is further configured to analyze one or more descriptors of interactions by one or more users with one or more copies of the mobile application and to generate a metric that measure a characteristic of user responses to the experiment based on the one or more descriptors of interactions.

The report module 560 is configured to access (e.g., receive) results of an experiment and to generate a report based on the results of the experiment. According to some example embodiments, the report module 560 accesses the result of an analysis of the data that describes interactions by one or more users with one or more copies of the mobile application executing an experiment generated by the experimentation machine 310 and generates a report based on the result of the analysis. In some example embodiments, the report includes one or more metrics that measure user responses to variations in user interfaces presented to the users to determine which variation elicits a desired response by the users.

In various example embodiments, the experiment that identifies the parameter is generated by the experimentation machine 310 to test user responses to user interface configurations that include different parameter values that correspond to the parameter. The experiment may indicate a specific configuration of the user interface displayable to the user of the mobile device upon the mobile application executing the instruction transmitted, by the communication module 540, to the mobile device storing the mobile application. The experiment may test a response of a user of the mobile device to a particular display configuration presented to the user as a result of the mobile application executing the instruction.

In some example embodiments, the mobile application stored on the mobile device is a first copy of the mobile application and the mobile device is a first mobile device associated with a first user. The communication module 540 is further configured to transmit the instruction to a second mobile device associated with a second user, based on a second identifier of the second mobile device. The analysis module 550 may access a first descriptor of a first interaction by the first user with the first copy of the mobile application upon the first copy of the mobile application executing the instruction. The analysis module 550 may also access a second descriptor of a second interaction by the second user with the second copy of the mobile application upon the second copy of the mobile application executing the instruction. The analysis module 550 may then generate a metric that measures a characteristic of user responses to the experiment based on the first descriptor and the second descriptor.

In certain example embodiments, the instruction generated by the instruction module 530 is a first instruction, the parameter value is a first parameter value, and the mobile device is a first mobile device that is associated with a first user and stores a first copy of the mobile application. The receiver module 510 is further configured to receive an identifier of a second mobile device. The second mobile device may be associated with a second user and may store a second copy of the mobile application. The parameter module 520 is further configured to identify a second parameter value that corresponds to the parameter. The identifying of the parameter may be based on the identifier of the second mobile device. The instruction module 530 is further configured to generate a second instruction executable by the second copy of the mobile application. The second instruction may reference the second parameter value. The communication module 540 is further configured to transmit the second instruction to the second mobile device in response to receiving the identifier of the second mobile device.

Figure 6:
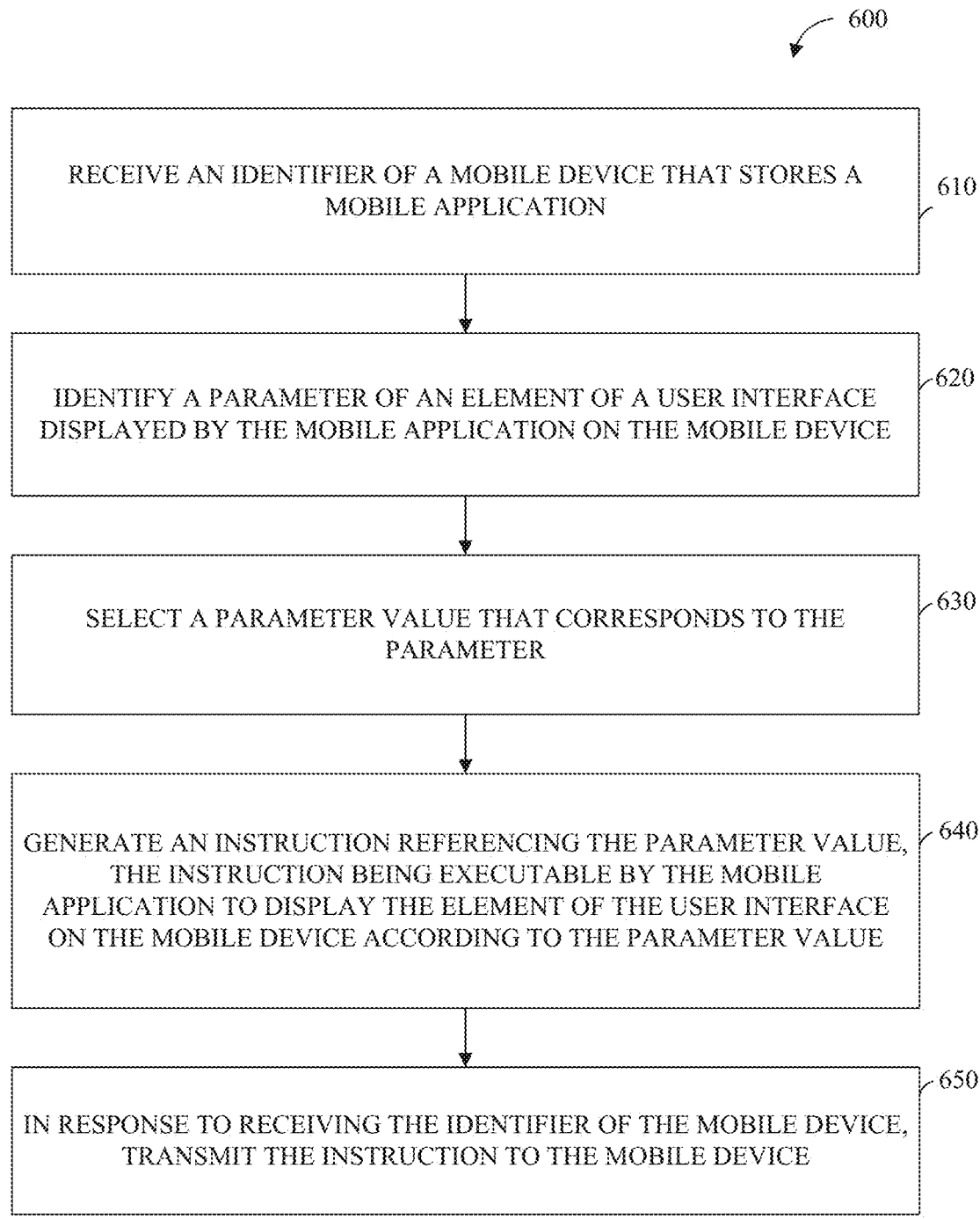
FIGS. 6-8 are flowcharts illustrating a method of performing A/B testing using a mobile application, according to some example embodiments.
Figure 7:
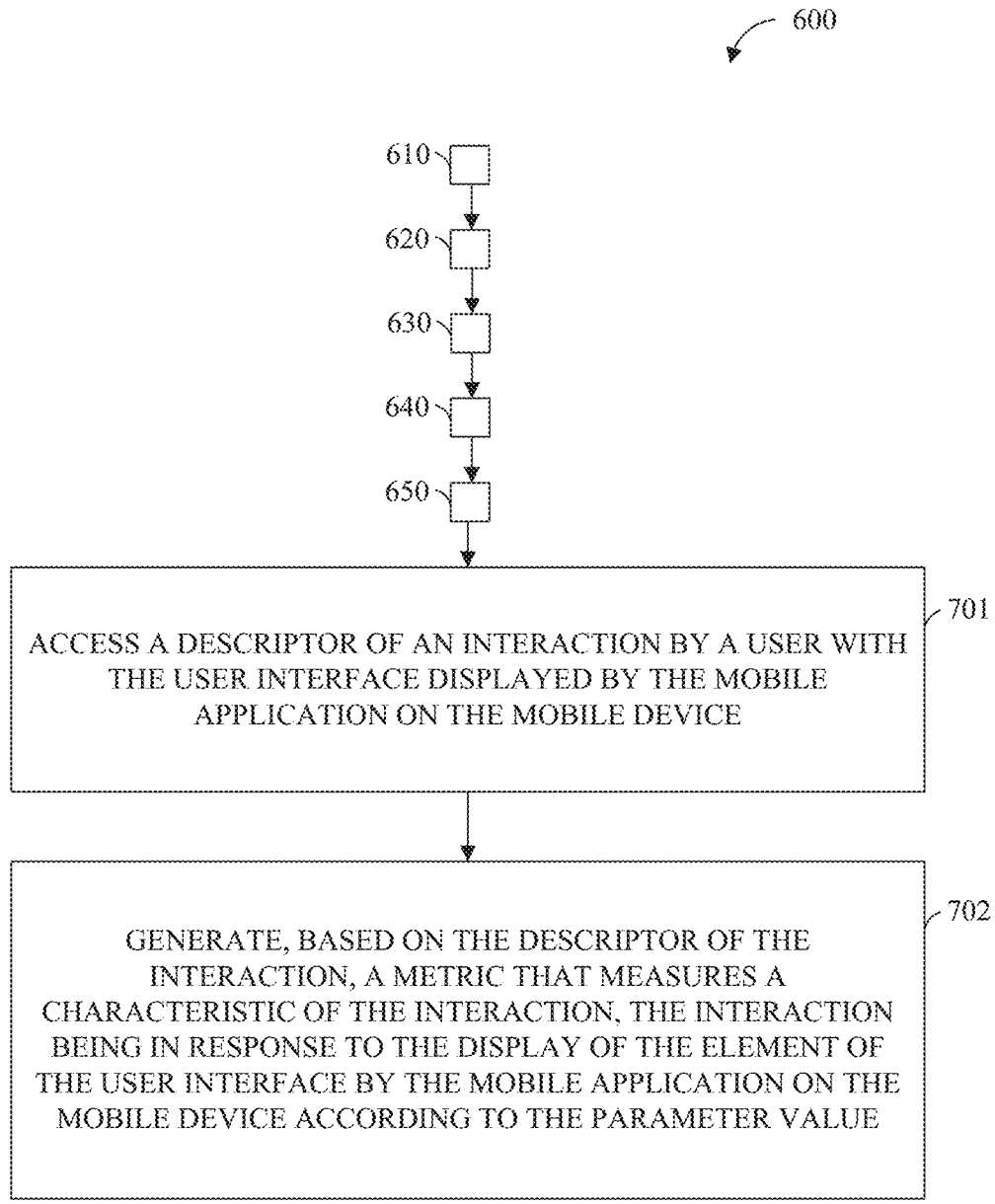
Figure 8:
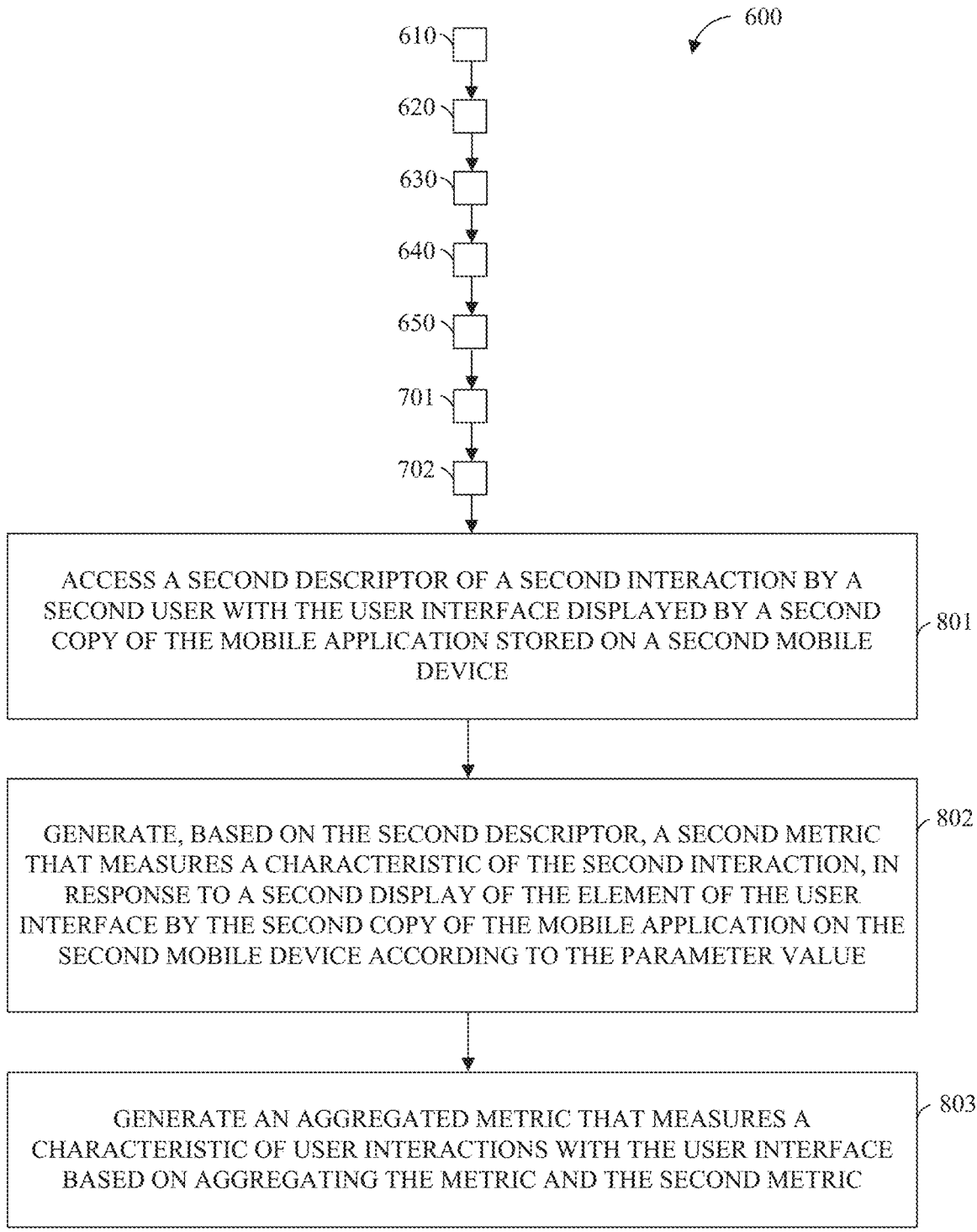

FIGS. 6-8 are flowcharts illustrating a method of performing A/B testing using a mobile application, according to some example embodiments. Operations in the method 600 may be performed using modules described above with respect to FIG. 5. As shown in FIG. 6, the method 600 may include one or more of operations 610, 620, 630, 640, and 650.

At method operation 610, the receiver module 510 receives an identifier of a mobile device that stores a mobile application. Examples of the identifier of the mobile device are a Unique Device Identifier (UDID), an International Mobile Station Equipment Identity (IMEI), a serial number, a Media Access Control (MAC) address of a mobile device interface, or an Integrated Circuit Card Identifier (ICCID). In some instances, the identifier of the mobile device may be transmitted (e.g., by the mobile device) to the experimentation machine 310 upon the user of the mobile application starting (e.g., launching, executing, running, etc.) the mobile application on the mobile device. The user may launch the mobile application on the user's mobile device by selecting an icon representing the mobile application in a user interface displayed to the user on the mobile device.

At method operation 620, the parameter module 620 identifies a parameter of an element of a user interface displayed by the mobile application on the mobile device. The parameter, the parameter value, or both may be identified based on the identifier of the mobile device. In some example embodiments, the parameter module 620 first identifies an experiment for the mobile application based on the identifier of the mobile device. The experiment, in some example embodiments, may be a description of one or more rules (e.g., UI configuration rules) that is stored in a record of a database (e.g., the database 126). The parameter module 620, based on the identified experimentation, may then identify the parameter.

At method operation 630, the parameter module 620 selects a parameter value that corresponds to the parameter. In some example embodiments, the experiment specifies the parameter and one or more parameter values that correspond to the parameter. The parameter module 620 may select the parameter value based on the experiment.

At method operation 640, the instruction module 530, using at least one processor, generates an instruction referencing the parameter value. The instruction is executable by the mobile application to configure a display of the user interface on the mobile device based on the parameter value.

At method operation 650, the communication module 540 transmits the instruction to the mobile device. The communication module 540 may transmit the instruction to the mobile device in response to the receiver module 510 receiving the identifier of the mobile device. Further details with respect to the method operations of the method 600 are described below with respect to FIGS. 7-8.

As shown in FIG. 7, the method 600 may include one or more of method operations 701 and 702, according to some example embodiments. Method operation 701 may be performed after the method operation 650, in which the communication module 540 transmits the instruction to the mobile device. At method operation 701, the analysis module 550 accesses (e.g., receives) a descriptor of (e.g., data describing) an interaction by the user with the user interface displayed by the mobile application on the mobile device. The user may be associated with the mobile device.

Method operation 702 may be performed after the method operation 701. At method operation 702, the analysis module 550 generates a metric that measures a characteristic of the interaction by the user with the user interface. Generating the metric that measures the characteristic of the interaction by the user with the user interface may, in one example, include determining whether the user clicked on a particular element of the user interface. In another example, generating the metric includes determining whether the user signed up, via the mobile application user interface, to receive one or more types of notifications (e.g., emails). The generating of the metric may be based on the descriptor of the interaction. The interaction by the user with the user interface may be in response to the display of the element of the user interface by the mobile application on the mobile device according to the parameter value.

As shown in FIG. 8, the method 600 may include one or more of method operations 801, 802, and 803, according to some example embodiments. Method operation 801 may be performed after the method operation 702, in which the analysis module 550 generates a metric that measures a characteristic of the interaction by the user with the user interface. In some example embodiments, the descriptor of the interaction by the user with the user interface displayed by the mobile application on the mobile device is a first descriptor of a first interaction by a first user with the user interface displayed by a first copy of the mobile application on a first mobile device.

At method operation 801, the analysis module 550 accesses a second descriptor of a second interaction by a second user with the user interface displayed by a second copy of the mobile application stored on a second mobile device. The second user may be associated with the second mobile device.

Method operation 802 may be performed after the method operation 801. At method operation 802, the analysis module 550 generates a second metric that measures a characteristic of the second interaction by the second user with the user interface. The generating of the second metric may be based on the second descriptor of the interaction. The second interaction by the second user with the user interface may be in response to a second display of the element of the user interface by the second copy of the mobile application on the second mobile device according to the parameter value.

Method operation 803 may be performed after the method operation 802. At method operation 803, the analysis module 550 generates an aggregated metric that measures a characteristic of user interactions with the user interface based on aggregating the first metric and the second metric.

Example Mobile Device

Figure 9:
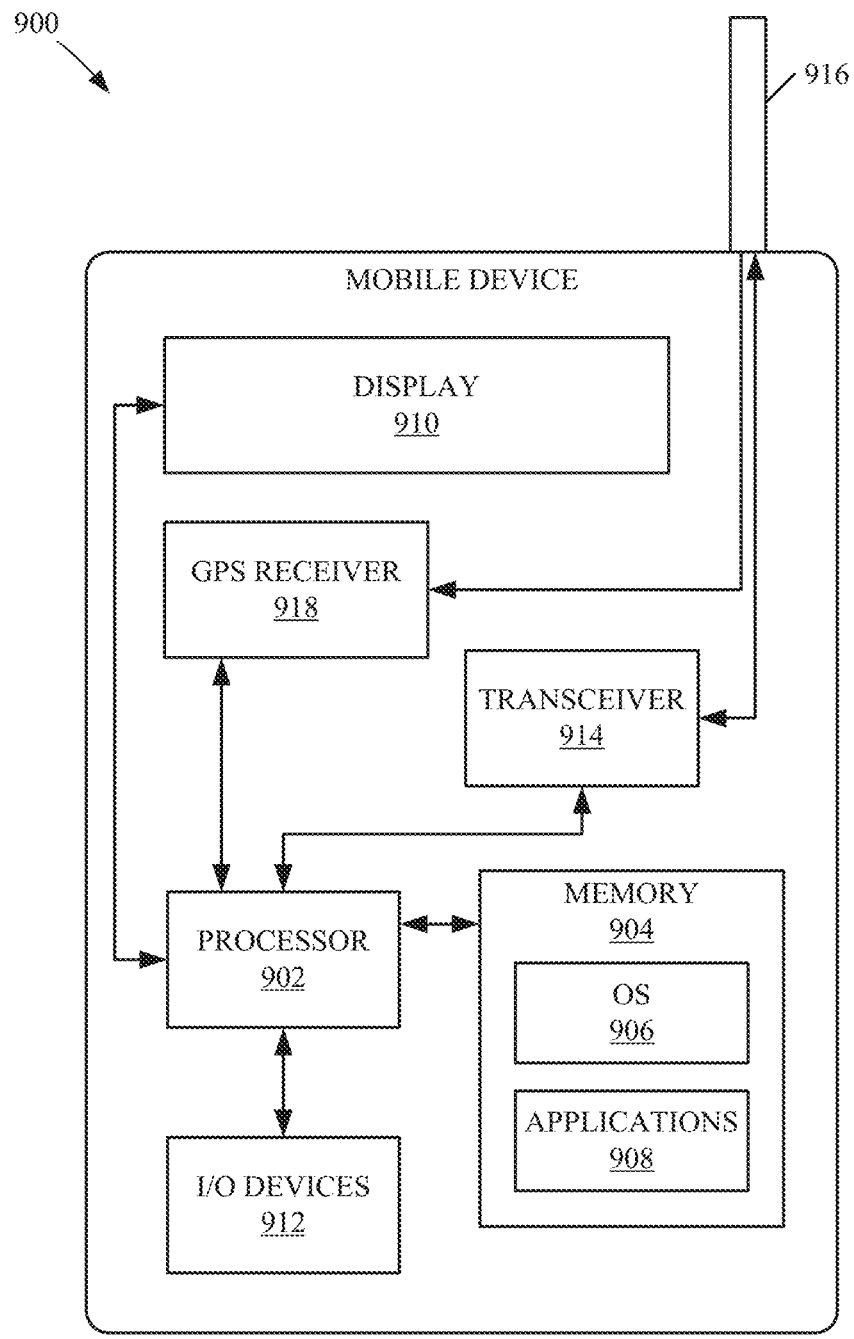
FIG. 9 is a block diagram illustrating a mobile device, according to some example embodiments.

FIG. 9 is a block diagram illustrating a mobile device 900, according to an example embodiment. The mobile device 900 may include a processor 902. The processor 902 may be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or other type of memory, is typically accessible to the processor 902. The memory 904 may be adapted to store an operating system (OS) 906, as well as application programs 908, such as a mobile location enabled application that may provide LBSs to a user. The processor 902 may be coupled, either directly or via appropriate intermediary hardware, to a display 910 and to one or more input/output (I/O) devices 912, such as a keypad, a touch panel sensor, a microphone, and the like. Similarly, in some embodiments, the processor 902 may be coupled to a transceiver 914 that interfaces with an antenna 916. The transceiver 914 may be configured to both transmit and receive cellular network signals, wireless data signals, or other types of signals via the antenna 916, depending on the nature of the mobile device 900. Further, in some configurations, a GPS receiver 918 may also make use of the antenna 916 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 902 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor 902 or other programmable processor 902) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 902 configured using software, the general-purpose processor 902 may be configured as respective different hardware-implemented modules at different times. Software may accordingly configure a processor 902, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902 or processor-implemented modules, not only residing within a single machine, but deployed across a number of machines. In some example embodiments, the one or more processors 902 or processor-implemented modules may be located in a single location (e.g., within a home environment, an office environment or as a server farm), while in other embodiments the one or more processors 902 or processor-implemented modules may be distributed across a number of locations.

The one or more processors 902 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 902, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 902 executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor 902), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
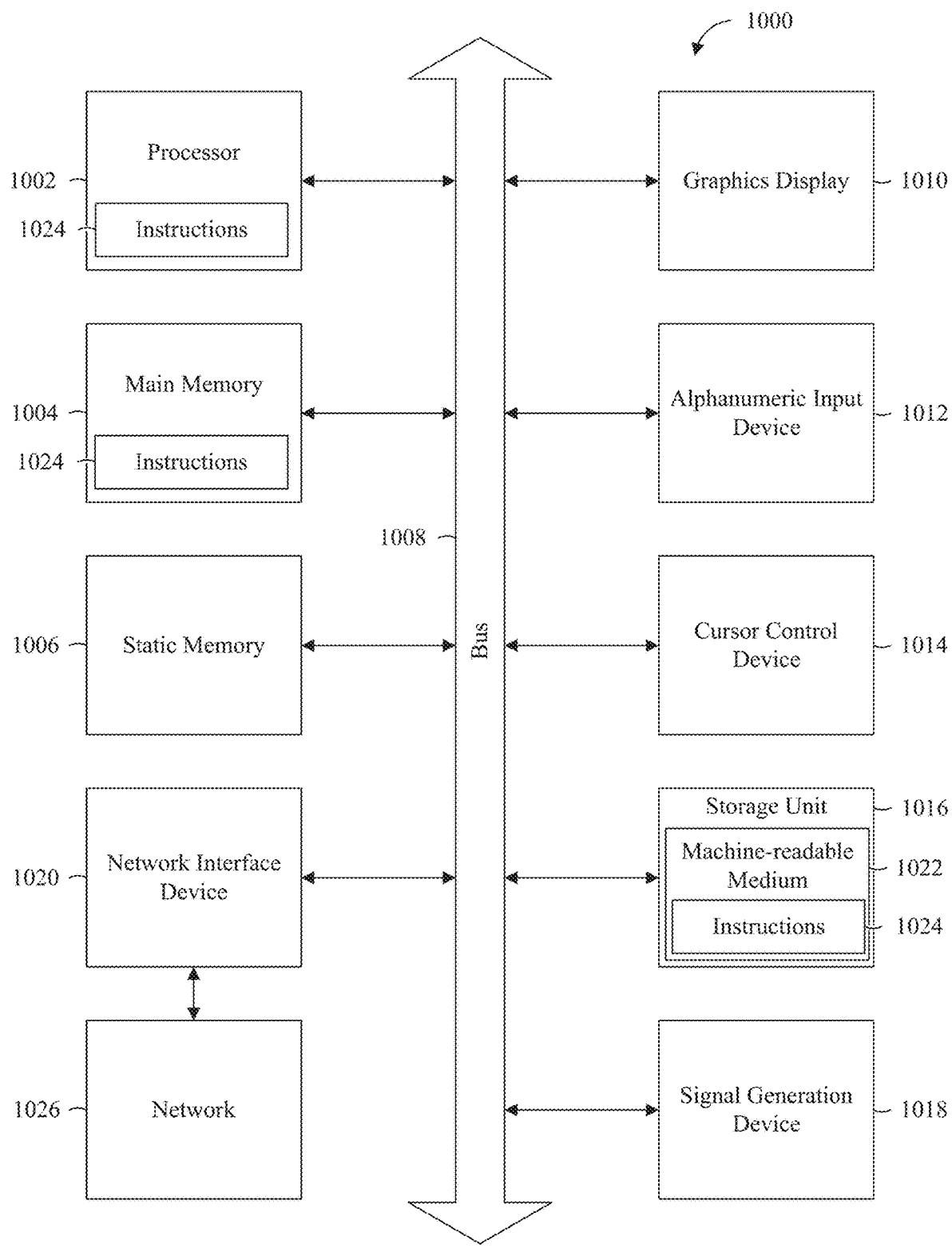
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions 1024 from a machine-readable medium 1022 (e.g., a non-transitory machine-readable medium, a machine-readable storage medium, a computer-readable storage medium, or any suitable combination thereof) and perform any one or more of the methodologies discussed herein, in whole or in part. Specifically, FIG. 10 shows the machine 1000 in the example form of a computer system (e.g., a computer) within which the instructions 1024 (e.g., software, a program, an application, an applet, an app, or other executable code) for causing the machine 1000 to perform any one or more of the methodologies discussed herein may be executed, in whole or in part.

In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include any collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The processor 1002 may contain microcircuits that are configurable, temporarily or permanently, by some or all of the instructions 1024 such that the processor 1002 is configurable to perform any one or more of the methodologies described herein, in whole or in part. For example, a set of one or more microcircuits of the processor 1002 may be configurable to execute one or more modules (e.g., software modules) described herein.

The machine 1000 may further include a graphics display 1010 (e.g., a plasma display panel (PDP), a light emitting diode (LED) display, a liquid crystal display (LCD), a projector, a cathode ray tube (CRT), or any other display capable of displaying graphics or video). The machine 1000 may also include an alphanumeric input device 1012 (e.g., a keyboard or keypad), a cursor control device 1014 (e.g., a mouse, a touchpad, a trackball, a joystick, a motion sensor, an eye tracking device, or other pointing instrument), a storage unit 1016, an audio generation device 1010 (e.g., a sound card, an amplifier, a speaker, a headphone jack, or any suitable combination thereof), and a network interface device 1020.

The storage unit 1016 includes the machine-readable medium 1022 (e.g., a tangible and non-transitory machine-readable storage medium) on which are stored the instructions 1024 embodying any one or more of the methodologies or functions described herein. The instructions 1024 may also reside, completely or at least partially, within the main memory 1004, within the processor 1002 (e.g., within the processor's cache memory), or both, before or during execution thereof by the machine 1000. Accordingly, the main memory 1004 and the processor 1002 may be considered machine-readable media (e.g., tangible and non-transitory machine-readable media). The instructions 1024 may be transmitted or received over the network 1026 via the network interface device 1020. For example, the network interface device 1020 may communicate the instructions 1024 using any one or more transfer protocols (e.g., hypertext transfer protocol (HTTP)).

In some example embodiments, the machine 1000 may be a portable computing device, such as a smart phone or tablet computer, and have one or more additional input components 1030 (e.g., sensors or gauges). Examples of such input components 1030 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1024 for execution by the machine 1000, such that the instructions 1024, when executed by one or more processors of the machine 1000 (e.g., processor 1002), cause the machine 1000 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving a request to access a website, the request including an identifier of a user associated with a mobile device, the identifier including user login information;
   determining, based on the user login information including a user login identifier, an experiment variant corresponding to a layout description that provides a configuration of one or more elements of a user interface of the website;
   causing display, at the mobile device, of the one or more elements of the user interface on the mobile device based on the layout description that corresponds to the experiment variant;
   tracking one or more user interactions with the one or more elements of the user interface on the mobile device; and
   generating metric data based on the one or more user interactions, the metric data including a click-through rate, a number of purchases, and a service registration record.

2. The method of claim 1, wherein the metric data comprising a measure of user response to the one or more elements displayed in the user interface, further comprising:
   causing display of a report based on a result of an experiment associated with the experiment variant, the report comprising the metric data.

3. The method of claim 1, wherein the experiment variant is determined based on the identifier of the user.

4. The method of claim 1, wherein the configuration of the one or more elements includes a specification of one or more parameters and one or more corresponding parameter values associated with the one or more elements of the user interface.

5. The method of claim 1, wherein the identifier of the user includes a mobile device identifier and a mobile application copy identifier.

6. A system comprising:
   one or more processors; and
   a non-transitory computer-readable storage medium comprising instructions that when executed by the one or more processors cause the one or more processors to perform operations comprising:

receiving a request to access a website, the request including an identifier of a user associated with a mobile device, the identifier including user login information;

determining, based on the user login information including a user login identifier, an experiment variant corresponding to a layout description that provides a configuration of one or more elements of a user interface of the website;

causing display, at the mobile device, of the one or more elements of the user interface on the mobile device based on the layout description that corresponds to the experiment variant;

tracking one or more user interactions with the one or more elements of the user interface on the mobile device; and generating metric data based on the one or more user interactions, the metric data including a click-through rate, a number of purchases, and a service registration record.

7. The system of claim 6, wherein the metric data comprising a measure of user response to the one or more elements displayed in the user interface, the one or more processors further perform operations comprising:

causing display of a report based on a result of an experiment associated with the experiment variant, the report comprising the metric data.

8. The system of claim 6, wherein the experiment variant is determined based on the identifier of the user.

9. The system of claim 6, wherein the configuration of the one or more elements includes a specification of one or more parameters and one or more corresponding parameter values associated with the one or more elements of the user interface.

10. The system of claim 6, wherein the identifier of the user includes a mobile device identifier and a mobile application copy identifier.

11. A machine-readable non-transitory storage medium having instruction data executable by a machine to cause the machine to perform operations comprising:

receiving a request to access a website, the request including an identifier of a user associated with a mobile device, the identifier including user login information;

determining, based on the user login information including a user login identifier, an experiment variant corresponding to a layout description that provides a configuration of one or more elements of a user interface of the website;

causing display, at the mobile device, of the one or more elements of the user interface on the mobile device based on the layout description that corresponds to the experiment variant;

tracking one or more user interactions with the one or more elements of the user interface on the mobile device; and generating metric data based on the one or more user interactions, the metric data including a click-through rate, a number of purchases, and a service registration record.

12. The machine-readable non-transitory storage medium of claim 11, wherein the metric data comprising a measure of user response to the one or more elements displayed in the user interface, causing the machine to perform further operations comprising:

causing display of a report based on a result of an experiment associated with the experiment variant, the report comprising the metric data.

13. The machine-readable non-transitory storage medium of claim 11, wherein the experiment variant is determined based on the identifier of the user.

14. The machine-readable non-transitory storage medium of claim 11, wherein the configuration of the one or more elements includes a specification of one or more parameters and one or more corresponding parameter values associated with the one or more elements of the user interface.

15. The machine-readable non-transitory storage medium of claim 11, wherein the identifier of the user includes a mobile device identifier and a mobile application copy identifier.

* * * * *